United States Patent
Billaud

(10) Patent No.: US 11,635,508 B2
(45) Date of Patent: Apr. 25, 2023

(54) METHOD FOR CHARACTERIZING THE DENSITY OF MODE S INTERROGATIONS AND RESPONSES AND SECONDARY RADAR IMPLEMENTING SUCH A METHOD

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 196 days.

(21) Appl. No.: 17/259,510

(22) PCT Filed: Aug. 29, 2019

(86) PCT No.: PCT/EP2019/073091
§ 371 (c)(1),
(2) Date: Jan. 11, 2021

(87) PCT Pub. No.: WO2020/043825
PCT Pub. Date: Mar. 5, 2020

(65) Prior Publication Data
US 2021/0270955 A1    Sep. 2, 2021

(30) Foreign Application Priority Data
Aug. 30, 2018  (FR) .................................... 1800914

(51) Int. Cl.
*G01S 13/78* (2006.01)
*G01S 13/933* (2020.01)
*G01S 13/87* (2006.01)

(52) U.S. Cl.
CPC .......... *G01S 13/784* (2013.01); *G01S 13/781* (2013.01); *G01S 13/87* (2013.01); *G01S 13/933* (2020.01)

(58) Field of Classification Search
CPC ...... G01S 13/74; G01S 13/781; G01S 13/784; G01S 13/87; G01S 13/91; G01S 13/933
See application file for complete search history.

(56) References Cited

U.S. PATENT DOCUMENTS 4,034,371 A * 7/1977 Maier ..................... G01S 13/22
342/43
4,174,519 A * 11/1979 Poli ....................... G01S 13/781
342/40

(Continued)

FOREIGN PATENT DOCUMENTS

EP    0 184 956 A1    6/1986
JP    3-59484 A       3/1991

(Continued)

*Primary Examiner* — Peter M Bythrow
(74) *Attorney, Agent, or Firm* — BakerHostetler

(57) ABSTRACT

A density of Mode S interrogations and responses in the environment covered by a secondary radar is characterized according to the following steps: a first step wherein the radar: detects and locates Mode S targets by way of their synchronous responses to the interrogations emitted by the radar; detects asynchronous responses emitted by the Mode S targets, and not elicited by the radar; for each target, associates its asynchronous responses with its synchronous response to the radar; a second step wherein the radar: based on the association, determines the response rate of each target by counting the number of synchronous and asynchronous responses received from the target per given time period; with the environment being divided into elementary space cells, determines the response rate per cell by counting the number of synchronous and asynchronous responses received by each target in each cell, the rate characterizing the density of Mode S interrogations per cell.

13 Claims, 7 Drawing Sheets

(56) References Cited

U.S. PATENT DOCUMENTS

| | | | | |
|---|---|---|---|---|
| 4,896,158 A * | 1/1990 | Cole, Jr. | G01S 13/784 | 342/40 |
| 5,081,457 A * | 1/1992 | Motisher | G01S 13/933 | 342/40 |
| 5,157,615 A * | 10/1992 | Brodegard | G01S 13/767 | 342/30 |
| 5,432,517 A * | 7/1995 | Billaud | G01S 13/784 | 342/40 |
| 5,459,469 A * | 10/1995 | Schuchman | G01S 13/765 | 342/36 |
| 5,825,322 A * | 10/1998 | Capozoli | G01S 13/762 | 342/372 |
| 6,473,027 B1 * | 10/2002 | Alon | G01S 7/414 | 342/36 |
| 7,408,498 B2 * | 8/2008 | Kuji | G01S 13/765 | 342/36 |
| 2007/0252750 A1 * | 11/2007 | Jean | G01S 13/784 | 342/40 |
| 2010/0026553 A1 * | 2/2010 | Billaud | G01S 13/782 | 342/37 |
| 2011/0128180 A1 * | 6/2011 | Fiori | G01S 13/782 | 342/93 |
| 2011/0279302 A1 * | 11/2011 | Billaud | G01S 13/782 | 342/45 |
| 2012/0092211 A1 * | 4/2012 | Hampel | G01S 13/765 | 342/175 |
| 2016/0033630 A1 * | 2/2016 | Harvey | G01S 13/781 | 342/43 |

FOREIGN PATENT DOCUMENTS

| | | |
|---|---|---|
| JP | 2001-56372 A | 2/2001 |
| JP | 2008-175784 A | 7/2008 |
| JP | 2010-512528 A | 4/2010 |
| JP | 2012-220283 A | 11/2012 |

* cited by examiner

METHOD FOR CHARACTERIZING THE DENSITY OF MODE S INTERROGATIONS AND RESPONSES AND SECONDARY RADAR IMPLEMENTING SUCH A METHOD

CROSS-REFERENCE TO RELATED APPLICATIONS

This application is a National Stage of International patent application PCT/EP2019/073091, filed on Aug. 29, 2019, which claims priority to foreign French patent application No. FR 1800914, filed on Aug. 30, 2018, the disclosures of which are incorporated by reference in their entirety.

FIELD OF THE INVENTION

The present invention relates to a method for characterizing the density of Mode S interrogations in the environment of one or more secondary radars. It also relates to a radar able to implement such a method.

The field of the invention is that of air traffic control (ATC) in the civil and military fields, for which the performance of secondary radars is important, more specifically in terms of the detection of aircraft.

BACKGROUND

The performance of a Mode S radar is linked directly to the availability of the transponders with which it dialogs. Specifically, a secondary radar, unlike a primary radar, is distinguished in that it establishes a dialog based on:
- a selective interrogation intended for a precise target via its Mode S address at 1030 MHz;
- a response from the aircraft transponders, encoded with its Mode S address at 1090 MHz.

The transponder of an aircraft dialogs with all of the radars surrounding it. Its capacity for dialog is physically limited, but should comply with the minimums defined by the International Civil Aviation Organization (ICAO).

Thus, beyond the limits of the number of possible responses (ultimately relatively low: 16 long responses per second), a transponder may not respond to selective radar interrogations. Now, the probability of guaranteed detection of a secondary radar is conventionally established on the basis of 90% availability of a transponder. However, the interrogation lobe of a radar has a duration of the order of 25 to 50 ms, that is to say of the class of one thirtieth of the time base of the specification of the transponder. As a result, if the transponder has just reached its saturation, for example in long response mode, it would therefore not respond during the short duration of the radar lobe just following its saturation, and the target therefore would not be seen by the radar.

In addition, in the event of over-interrogation of an area, even if the interrogations do not concern a transponder, and therefore do not consume its response rate, said transponder nevertheless loses its availability rate since it is blocked for a specified duration following the processing of an interrogation, whether or not it is followed by the generation of a response. This reduces the effective range of the radar since, for a distant target, the number of interrogations of the radar on such a target are naturally more limited in terms of number in a radar beam for radio budget reasons.

According to the prior art, the only means to ascertain the interrogation rate of aircraft are those of performing calibration flights with a specialist aircraft in order to measure the interrogation rate that it receives during its flight through the geographical areas to be analyzed. This solution is expensive and above all evaluates the situation only at a given instant and only for each position of the trajectory of this aircraft at the time when it is located there.

In addition, considering that radar beams have rotation periods of the order of 5 seconds on average, the measurement performed by a flight dedicated to this measurement is only able to be carried out for a single phase offset state between the rotations of the radar beams. This therefore does not cover all of the possible temporal interrogation combinations per area of space due to all of the interrogators.

SUMMARY OF THE INVENTION

One aim of the invention is to overcome the abovementioned drawbacks. To this end, one subject of the invention is a method for characterizing the density of Mode S interrogations and responses in the environment of at least one operational secondary radar, said environment being defined by the airspace domain covered by said radar, said environment being passed through by Mode S targets, a Mode S target being a target emitting a response to the Mode S interrogations emitted by a secondary radar, said method comprising at least:
  a first step in which said radar:
    detects and locates Mode S targets by way of their synchronous responses to the interrogations emitted by said radar or their positions transmitted in long ADS-B squitters;
    detects asynchronous responses emitted by the same Mode S targets, and therefore not elicited by said radar;
    for each located target, associates its asynchronous responses with the synchronous responses to said radar or the positions given by said ADS-B squitters;
  a second step in which said radar:
    based on said association, determines the response rate of each target by counting the number of synchronous and asynchronous responses received from said target for various given time periods;
    with said environment being divided into elementary space cells, determines the response rate per cell by counting the number of synchronous and asynchronous responses received by each target located in each cell, said rate characterizing the density of Mode S interrogations and responses per cell or per group of cells.

In one particular mode of implementation, the asynchronous responses are detected by said radar through continuous processing involving detecting and decoding the asynchronous responses received on each antenna pattern, said processing separately utilizing each of said patterns. Said patterns are for example the sum pattern, the difference pattern, the front control pattern and the back control pattern.

Said asynchronous responses not elicited by said radar are for example:
  responses elicited by another secondary radar, which may be any type of interrogator;
  and/or responses generated automatically by said targets, comprising ADS-B or TCAS squitter responses.

In said second step, said radar for example characterizes the sources of asynchronous responses, said sources being secondary radars, which may be any type of interrogator, a source being characterized by at least one feature from among the following features:
  the identity of said source;
  the rotation period of the antenna of said source;
  the location of said source;

the "All Call" interrogation rate of said source;
the width of the interrogation lobe of said source;
the power radiated by said source.

An alert signal is for example generated when the rate of responses received from a target exceeds a given threshold.

An alert signal is for example generated when the response rate of at least one cell exceeds a given threshold.

In one particular embodiment, with the blocking of a target being the inability of said target to emit a response to a Mode S interrogation, in said second step, said radar characterizes the blocking rate of a target by analyzing the asynchronous responses from said target:
  either by characterizing the lack of response from the transponder of this target:
    by its occupation to generate a response using a synchronous fruit of the interrogation that has not received a response at the transponder;
    or by a response rate beyond the ICAO limits within the period prior to the lack of response to an interrogation;
  or by assuming another scenario corresponding to:
    an overlap of interrogations emitted by a plurality of sensors and not interpreted by the transponder of this target;
    a transponder of this target having reached its maximum response rate, even though this is below the ICAO minimum.

With said first step and said second step being executed in a multi-radar context, that is to say by at least two secondary radars, said response rates obtained by each of said at least two radars are for example calculated considering all of the synchronous and asynchronous responses from the two radars in order to obtain more precise overall response rates, the interrogation density being characterized by way of these overall rates.

Said blocking rates obtained by each of said at least two radars are for example calculated considering all of the synchronous and asynchronous responses from the two radars in order to obtain a more precise overall blocking rate.

The information obtained from each of said at least two radars is for example transmitted to an air traffic control center and utilized by said center.

Said information is for example utilized to allow all of the secondary radars to be adjusted in order to eliminate areas of over-interrogation, of blocking of the transponders as well as faulty transponders in order to increase ATC surveillance safety.

Another subject of the invention is a radar implementing a method as described above.

BRIEF DESCRIPTION OF THE DRAWINGS

Other features and advantages of the invention will become apparent with the aid of the following description, given with reference to appended drawings, in which.

DETAILED DESCRIPTION

Figure 1:
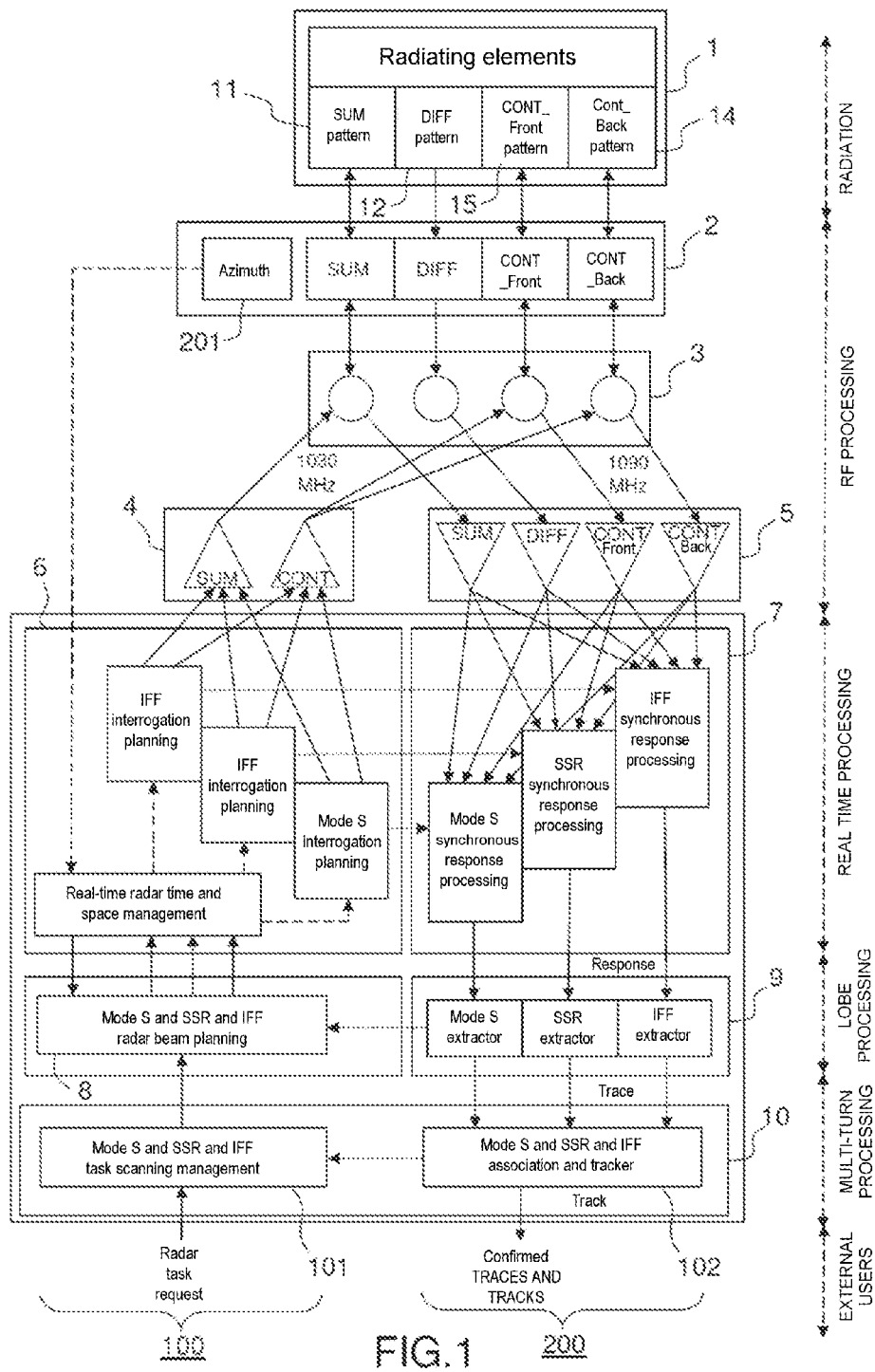
FIG. 1 shows an example of an overview of a Mode S secondary radar.

The main purposes of ultimately obtaining continuous knowledge of the interrogation and response rate per area of space are notably:
  for the person in charge of a radar, to be able to detect existing conflicts (fruit density, lack of response to interrogations, use of the same II/SI code) for which a rapid response is required
  for the ATC system, in charge of a plurality of radars sharing the same geographical area, to be able to:
    adjust the overall operation by adapting the parameters of the radars in the area, now taking into account their measured interactions, and thus avoid geographical areas where transponders are blocked because they are over-interrogated;
    track the evolution over a long period (day, month, years) in order to see its changes as a function of air flows and to ensure the relevance of the configuration;
    detect and locate unreferenced external interrogation sources.

It is recalled that non-elicited responses may be referred to hereinafter as "fruit" in line with the expression "False Reply Unsynchronized In Time". These responses are so named because:
  they are not expected by the radar, which rejects them ("False");
  they are responses highly similar to those that are synchronous and come from the same targets within the same coverage of the radar, having the same frequency and the same message format ("Reply");
  they are not associated with an interrogation of this radar ("Unsynchronized in Time"):
    but of another operational radar
    or even of unintentional or malicious intruder interrogators
  or even emitted periodically by the target, such as
  ADS-B_out or TCAS squitters in case of inter-aircraft conflict resolution. In the text of the patent, the term ADS-B is used to represent fruits coming spontaneously from aircraft. Long ADS-B_out ("Automatic Dependent Surveillance-Broadcast") squitters are items of position information supplied by aircraft that are not triggered in response to radar interrogation signals but are emitted automatically from emission means of aircraft.

As will be described in more detail below, the solution according to the invention consists in analyzing the fruits generated by the targets that a radar manages with the other surrounding radars, as well as the ADS-B_out squitters that they emit. A secondary radar then enriches the plot that it transmits of a given aircraft with the features of the fruits that it has successfully detected for this target, these features being for example the following:

number of fruits by length and type (fruit/squitter), in particular in order to evaluate the situation of the target with respect to the limits imposed by the ICAO and outlined above;

for each fruit (non-limiting list):
   length of the fruit;
   type of fruit;
   position of the aircraft when the fruit is received by the radar;
   II/SI code of the squitter or interrogating radar;
notably in order to evaluate the interrogation rate per geographical area.

This enrichment takes place following each detection of the same aircraft.

Next, either locally at the radar or in a system maintenance center receiving this information/these features, this elementary information is combined for this target, in order to define the average and the peaks of response rates during its flight, and thus evaluate the situation of the target with respect to the limits imposed by the ICAO.

This information is also combined with all of the information of the same type coming from the targets managed by the radar in order to establish, per geographical area, the response rate at 1090 MHz, making it possible to target geographical areas with high interrogation.

A 2D or 3D geographical map (cartography) of the Mode S interrogation rate is thus established according to various measurement durations, whatever the source thereof, within the coverage of a secondary radar.

In addition, by utilizing the geographical distribution of the fruits from unlocked aircraft giving the identity of the interrogating radar, it is possible to identify some of the radars potentially participating in a response rate at 1090 MHz. This is highly useful especially if this is too high and leads to lack of detection from other radars requiring a relatively quick corrective response.

The function of detecting, locating and characterizing surrounding Mode S interrogators (Radar, WAM, etc.) may be considered:
   to be a function as such, for example in a military use of a radar projected onto an operational theater,
   but also, for example in a civil use, to be an attribute of the fruit rate per geographical area, allowing optimization of multi-radar ATC surveillance (knowing which radar to act on in order to reduce the local transponder interrogation rate).

It is specified that the term surrounding radar may be used hereinafter on a generic basis to cover all types of interrogators.

With reference to FIG. 1, which shows an exemplary overview of a Mode S secondary radar, a reminder is given of the principles of such a radar. This principle (Mode S exchanges between interrogator and transponder being defined in detail by the ICAO, Annex 10, vol. 4) consists in:
   emitting selective interrogations:
      either indicating the intended recipient: a single target denoted by its Mode S address (24-bit field);
      or indicating the identifier of the emitter (Identifier Code_IC);
   receiving selective responses:
      indicating the identifier of the emitter: the same Mode S address of the target;
      the main content of which depends on the message:
   DF4: defining the altitude;
   DF5: defining the identity (code A);
   DF20: defining the altitude plus the BDS register, the number of which is known notably through the interrogation that requested it;
   DF21: defining the identity (code A) plus the BDS register, the number of which is known elsewhere by the interrogation that requested it.

In the remainder of the description, consideration will mainly be given to the radar from the aspect of the Mode S protocol, whether or not it has the capacity to also process the SSR and IFF protocols that are not involved in the method according to the invention but are nevertheless present in the most complete configuration of a secondary surveillance radar.

In its usual use, the secondary radar operates in synchronous mode, that is to say it emits an interrogation and waits for a response consistent therewith, thereby allowing it to locate through measurement (in terms of azimuth and distance) and identify (by the Mode S address) the target.

In order to perform this task effectively, the radar is equipped with an antenna 1 having a plurality of patterns 11, 12, 14, 15, whose roles are conventionally:
   a sum pattern 11, hereinafter denoted SUM, for interrogating and detecting the synchronous response from the target;
   a difference pattern 12, denoted DIFF, for accurately locating the target in the SUM beam;
   a first front control pattern 15, denoted CONT_front, for blocking and rejecting the responses coming from targets facing the antenna and not present in the main SUM beam but interrogated by a secondary SUM lobe;
   a second back control pattern 14, denoted CONT_back, for blocking and rejecting the responses coming from targets at the back of the antenna (therefore necessarily not present in the SUM beam but interrogated by SUM frontal lobe fruits).

Depending on the missions and therefore the expected performance of the radar, the antennas may:
   have a plurality of patterns:
   4 patterns: SUM, DIFF, CONT_Front & CONT_Back;
   3 patterns: SUM, DIFF, CONT (CONT_Front and CONT_Back are grouped together at the antenna);
   2 patterns: SUM, DIFF/CONT (DIFF, CONT_Front & CONT_Back are grouped together at the antenna).
   have different dimensions:
   in terms of width:
      having a large width in order to have a fine main beam providing a high gain as well as to be selective and precise in terms of azimuth;
      having a medium or small width for a mobility requirement of the radar (mainly in IFF mode).
   in terms of elevation:
      having a large elevation, of Large Vertical Aperture (LVA) type, providing gain and protection against ground reflections (mainly in civil ATC);
      having a small elevation, of "beam" type, providing mobility (mainly in IFF mode).

While the SUM and DIFF patterns are conventionally fine with 3 dB lobes between 2.4° and 10°, the CONT_Front and CONT_Back patterns each respectively seek to cover practically 180°.

The antennas may also:
   have a fixed pattern, known as "mechanical" and rotating;
   have a changing pattern, with electronic scanning, known as fixed or rotating "AESAs".

In the following text, a description is given of the most complete antenna configuration, that is to say 4 rotary antenna patterns, knowing that the other configurations are treated in a similar manner regardless of the number of antenna patterns utilized, whether the antenna is rotating or fixed. To simplify the description, however, by way of example in the remainder of the description, it is possible to use the configuration with 3 patterns by using CONT instead of CONT_Front and CONT_Back.

The fundamental principle of the ADS-B squitter receiver using the same Mode S protocol (messages defined in detail by the ICAO, Annex 10, vol. 4) consists in:
  receiving non-elicited and therefore asynchronous selective responses:
    indicating the identifier of the emitter: the same Mode S address (24-bit field) of the target as that transmitted to the radar;
    the nature of the content of the message (DF=17), the nature of which varies according to the TC field of the message:
      1 to 4 "Aircraft identification"
      5 to 8 "Surface position"
      9 to 18 "Airborne position (Baro Alt)"
      19 "Airborne velocities"
      20 to 22 "Airborne position (GNSS Height)"
      23 "Test message"
      24 "Surface system status"
      25 to 27 "Reserved"
      28 "Extended squitter AC status"
      29 "Target state and status (V.2)"
      30 "Reserved"
      31 "Aircraft Operation status".

The above list is given by way of example, and is indicative and changing.

In its usual use, an ADS-B_in receiver therefore operates in asynchronous mode, that is to say that it listens over 360° for a Mode S message highly similar to that from the radar for locating (azimuth and distance) and identifying (Mode S address) a target.

In order to effectively perform this task, the ADS-B_in receiver is equipped:
  either with an omnidirectional antenna covering 360°, which is a common configuration;
  or with a plurality of wide-pattern antennas covering 360° in total:
    two back-to-back antennas with coverage greater than 180°, which is the most common configuration;
    more rarely three antennas with coverage greater than 120° or even four antennas with coverage greater than 90°;
the role of which is only, through a single pattern (of sum type), to detect the asynchronous response from the target and to decode the content thereof, according to the formats recalled above.

Given that the secondary radar and the ADS-B receiver utilize almost identical messages (same 1090 MHz frequency, same waveform, same data structure of the response message), it is easy to integrate the function of listening for asynchronous ADS-B squitters into the radar by listening for them using the various patterns of the antenna of the radar and to do so mainly, but not solely, using the omnidirectional pattern:
  either using a reception function associated with an omnidirectional antenna pattern: CONT;
  or using two receivers each associated with one of the two semi-omnidirectional antenna patterns: CONT_front & CONT_Back.

Before describing the invention in more detail, a description is given of the elements forming the Mode S radar from FIG. 1. The overview shows the synchronous operation of the Mode S radar:
  on the left-hand part 100 through the generation of interrogations;
  on the right-hand part 200 through the synchronous processing of the associated responses,
as well as the synchronizations between them through the transverse arrows between left and right.

The functions of the main elements are recalled below:
The antenna 1 radiates interrogations at 1030 MHz and return responses at 1090 MHz, in accordance with the four patterns: SUM, DIFF, CONT_Front and CONT_Back, or three patterns (SUM, DIFF, CONT), or in accordance with two patterns (SUM, DIFF/CONT).

A rotating seal 2 and antenna drop cables, for a rotating antenna, ensure:
  RF coupling of the signals transmitted at 1030 MHz and received at 1090 MHz, independently for the four patterns between the rotating part and the fixed part of the radar;
  the distribution of the azimuthal position 201 of the axis of the main lobe of the antenna.
RF processing comprises:
  a duplexer or circulator 3 ensuring the RF coupling between the signals transmitted at 1030 MHz and received at 1090 MHz, independently for the four patterns;
  an emitter 4 ensuring:
    the transmission of the interrogations at 1030 MHz on the SUM pattern;
    the blocking of the transponders outside the SUM lobe at 1030 MHz through the CONT_Front and CONT_Back patterns;
    specifically for the various secondary protocols: IFF, SSR and Mode S;
  a receiver 5 ensuring the reception of the responses at 1090 MHz on the four patterns SUM, DIFF, CONT_Front and CONT_Back, for the various secondary protocols: IFF, SSR and Mode S.
Real-time processing comprises:
space time management 6 ensuring the real-time management of the associated interrogation and listening periods for the various secondary protocols: IFF, SSR and Mode S;
processing of the signal 7 ensuring:
  the processing of the responses within the listening periods associated with the interrogations for the various secondary protocols: IFF, SSR and Mode S;
  the detection and the decoding of the synchronous responses in the main lobe of the antenna by utilizing the four patterns:
    SUM: for detecting the responses received in the main lobe;
    DIFF: for accurately locating, in terms of azimuth, the responses received in the main SUM lobe and possibly for the detection;
    CONT_Front and CONT_Back: for rejecting the responses received on the secondary lobes of SUM and DIFF in the case of detection in the main lobe of DIFF.
Processing in the main lobe of the antenna comprises:
  management 8 of the targets present in the lobe, ensuring:
    the preparation of the transactions (interrogations and responses) to be performed in the next lobe for the various secondary protocols IFF, SSR and Mode S;

the placement of the Mode S interrogations and responses in the future "Roll call" period depending on the status of the transactions that have just been performed.

extractors 9 ensuring the formation of plots for each of the various secondary protocols IFF, SSR and Mode S, from the synchronous responses received in the lobe according to the protocol used during the interrogations.

Multi-turn processing 10 comprises:

management 1001 of the Mode S tasks to be performed with targets within the coverage, ensuring the prediction of positions of the targets (antenna rendezvous) and the preparation of the tasks to be performed with these positions according to internal and external requests and the status of the transactions from previous turns;

association of the plots and tracking 1002 of the targets within the coverage, ensuring the tracking of the targets in order to improve performance (elimination of false plots, notably monitoring of decoded data) and to predict the future position thereof.

An interface with the users allows the radar to take into account various requests and makes it possible to view the plots and the target tracks.

Figure 2:
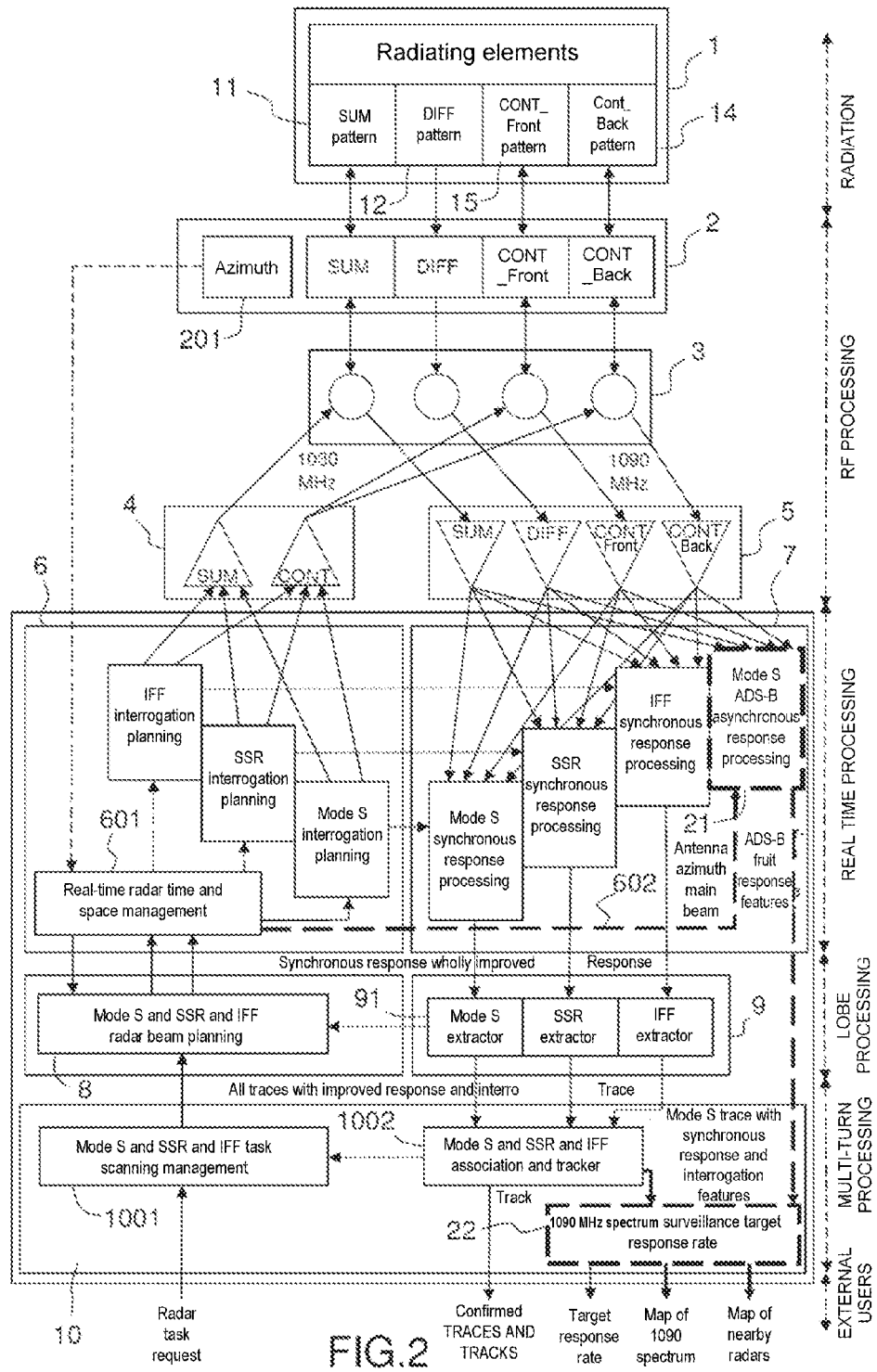
FIG. 2 shows a hardware-based exemplary implementation of the invention based on the overview of the radar from FIG. 1.

FIG. 2 illustrates the hardware-based implementation of the invention, showing the overview of the radar from FIG. 1 plus the elements specific to the invention. These elements are shown in broken lines.

While the operation of the Mode S radar is synchronous, FIG. 2 shows that the processing operations added for the invention are not linked to emission, and utilize only the azimuthal position of the axis of the main lobe of the antenna.

The majority of the elements remain unchanged, satisfying both:

the lack of intrusion of the invention into the operational operation of the Mode S radar;

the use of the same elements as those that the radar utilizes;

in airborne mode, in the broad sense:
antenna, rotating seal, antenna drop cables;

in processing mode, in the broad sense:
receiver, signal processing, data processing, etc.

thus allowing correlation of the synchronous and asynchronous responses coming from the same aircraft.

The roles of the main added elements or functions are described below.

In the real-time processing 6, the space time management 601 transmits the azimuthal position of the main lobe of the antenna and the time to the processing 21 of the asynchronous Mode S responses, this function having been added (see below).

In the processing of the signal 7, the processing 21 of the asynchronous Mode S responses is added (independently of the listening periods associated with the interrogations). This processing 21 is continuous and ensures the detection and decoding of the asynchronous responses (fruit) by utilizing, separately but additionally, the four patterns SUM, DIFF, CONT_Front and CONT_Back:

to detect all of the received responses: asynchronous and synchronous;

to decode responses of any type (DF0/4/5/11/16/17/18/20/21), the data in the message and especially to extract the Mode S address therefrom (including ADSB and TCAS squitters);

to enrich each decoded response with its features: detection time, azimuth of the main lobe of the antenna during the detection, power received on SUM, DIFF, CONT_Front and CONT_Back and depointing of the fruit in the main lobe if it is received in the main lobe.

The synchronous responses are also enriched by the power measured on SUM, DIFF, CONT_Front and the antenna azimuth.

In the processing in the main lobe, and more specifically in the Mode S extractor 91, the Mode S plots are enriched with their synchronous responses, each with the power measured on SUM, DIFF, CONT_Front and the antenna azimuth (the detection time being an attribute already required in ATC) as well as the emitted interrogations, whether or not they have obtained a response from the transponder.

In multi-turn processing, the association 1002 of the plots and tracking of the targets within the coverage (Association & Tracker) transmits the tracks, with Mode S address, with the responses enriched with the power measured on SUM, DIFF, CONT_Front and the antenna azimuth. The processing 22 of the response rate is added, which notably:

associates the fruits (asynchronous response) with the synchronous plots of the coverage;

identifies the fruit sources;

estimates the characterization of the fruit sources (location, rotation, power, "All call" (AC) interrogation rate, radiated power, antenna lobe, etc.)

performs processing per track during a flight within the coverage of the radar with:

characterization for various time slots of the response rate;

characterization for various time slots of the blocking rate (lack of response from a transponder to a radar interrogation);

management (monitoring) of these rates in order to generate pre-alerts for a faulty transponder;

processing by area divided into elementary cells, with:

characterization for various time slots of the response rate;

characterization for various time slots of the blocking rate;

monitoring of these rates in order to generate pre-alerts for a local overload.

processing for detecting surrounding interrogators including pre-location of each interrogator characterization of the interrogator (rotation, power, "All call" (AC) interrogation rate, radiated power, antenna lobe, etc.).

Figure 3:
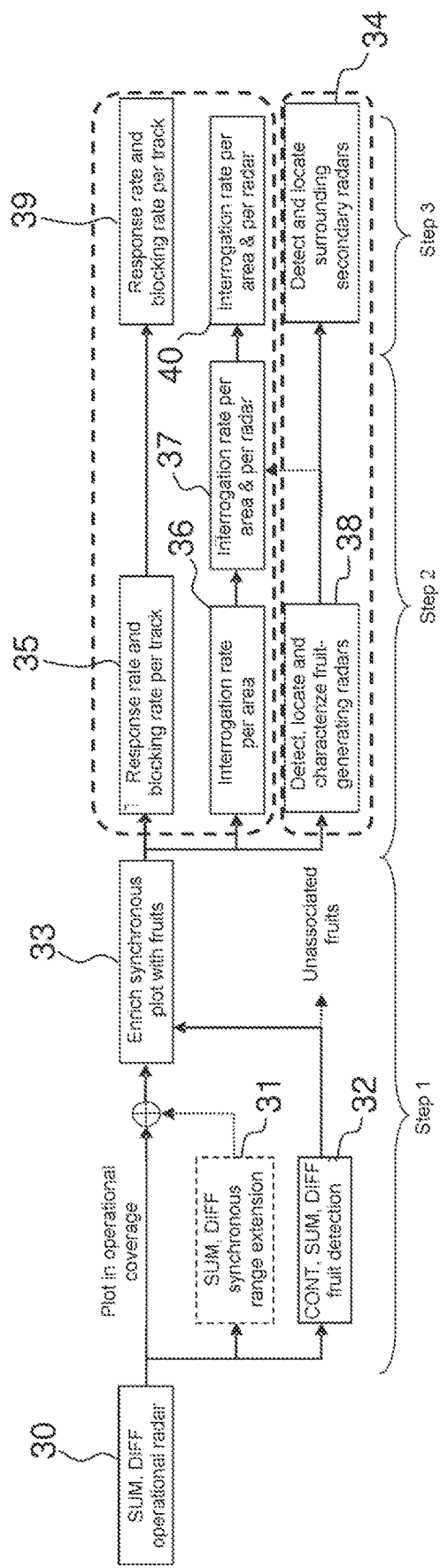
FIG. 3 shows an illustration of the possible steps for implementing the invention.

FIG. 3 illustrates the principle of the invention by showing the possible steps of the method according to the invention.

The invention advantageously utilizes the existing resources of an operational Mode S secondary radar 30 to measure the features:

of the spectrum at 1090 MHz;
of the transponders;
of the surrounding radars;

via the Mode S responses and lacks of responses from the transponders fitted to the aircraft within the coverage of the radar, specifically without modifying its operational behavior. In particular, there are no additional interrogations generated, but only passive listening to the radar environment.

This approach with a single radar may be extended in a context with a plurality of secondary radars, thus making it possible to increase the surface covered and to improve the precision of the measurements. A "lack of response" means that the radar did not receive a response to its interrogation.

The three steps of FIG. 3 are described in a broad manner below.

First Step:

In this first step, RF detection is performed at the operational secondary radar, preferably using up to four patterns of the antenna in order to ensure the best temporal coverage for effectively listening for asynchronous responses, with a sufficient signal level. The detection consists in:

detecting and locating all possible Mode S targets via their enriched synchronous responses;
  optionally: extending 31 the listening range of the invention beyond the operational coverage of the radar, making it possible notably to decorrelate the operational range of the radar from that of the invention;
detecting the fruits 32, these responses not elicited by the Mode S radar being:
  either elicited by another sensor (another radar, WAM notably) sharing the same space;
  or generated automatically by the target itself, notably of TCAS or ADS-B squitter type.

In this first step, the fruits are also associated 33 with the plots (Mode S and/or ADS-B) for each target detected by the radar or the ADS-B by the fruits that it has generated (on the basis of the unique Mode S address of the transponder as target identifier) between two successive synchronous detections in Mode S or on a turn basis, for example. This association will subsequently make it possible, for each target, to count the number of asynchronous responses and synchronous responses received per given period of time.

Following the detection 33 of the fruits, there are fruits for which it is not known how to associate them with plots (unassociated fruits), typically those coming from targets outside the operational area of coverage of the radar but whose emitted level nevertheless allows them to be received by the invention by the radar in question.

As an option, the fruits from each target may be classified by the source that elicited them, on the basis of the II or SI identifier of the interrogator (II meaning "Interrogator Identifier" and SI meaning "Surveillance Identifier"). In the remainder of the patent, the term II will be used to represent both II and SI.

Second Step:

In this second step, from the enriched plots 33, the response rate and the blocking rate of each target is characterized 35 by the radar.

For various time periods, the response rate 35 of a target is measured by counting all of the synchronous and asynchronous responses generated by each target and received by the radar.

For various time periods, the blocking rate of the target with respect to this radar is estimated according to 2 different types:

either in terms of the responses generated by this target, by reconciling the lacks of responses from the target in the lobe of the radar with its Mode S interrogations with the fruits generated by this target (including the dead time after response generation): in this case, with the transponder of the target being in the process of generating a response, the lack of response is clearly identified;
or in terms of the responses that it does not generate, by estimating the interrogation rate of the target that blocked it without generating a response. (interrogation rejected, entanglement of interrogations that are therefore not interpreted, saturation of the transponder reached, etc.).

A pre-alert may be generated automatically when the rates exceed user-defined thresholds. These are defined a priori in order to detect a potential fault with the transponder of the target:

either in relation to the minimums defined by the ICAO;
or in relation to the assumptions made during the installation of this radar.

The 1090 MHz spectrum (radar emission frequency for the interrogations) in the radar coverage is also characterized. As will be described hereinafter, this characterization of the 1090 MHz spectrum in fact corresponds to determining 36, 37 the rate of synchronous and asynchronous responses per area of the airspace covered by the secondary radar.

With the airspace being divided into elementary 3D "Latitude-Longitude-Altitude" cells (for example according to a principle similar to operational Mode S coverage maps of the operational operation of a Mode S radar), the following is performed per cell (or group of cells):

counting the number of synchronous and asynchronous responses generated by each target and received by this radar, thereby making it possible notably to construct a map of the response rate according to the position of the targets in space according to a plurality of time periods over a given unit of time, for example:
  one day: for an average value
  one second: to show the peaks of responses;
counting the number of times each target is blocked from the interrogations from this radar, thereby making it possible to construct a map of the blocking rate according to the position of the targets in space according to a plurality of time periods over a given unit of time (one day or one second for example).

The total number of synchronous responses and asynchronous responses coming from the targets of each cell, per given period of time, makes it possible to obtain a response rate that characterizes each cell in the space covered by the secondary radar. This response rate ultimately characterizes the Mode S interrogation rate in each cell by separating the received fruits according to their nature, either elicited by a sensor (DF11/4/5/20/21) or transmitted without interrogation having caused them (DF0/16/17/18). In other words, it characterizes the interrogation density of all of the secondary radars surrounding the secondary radar implementing the method. It is thus possible to map the density of Mode S interrogations in the environment of said radar.

A pre-alert may be generated automatically when the rates exceed user-defined thresholds. These are defined a priori in order to allow an operator adjusting the 1090 MHz spectrum to locally reconfigure the radars (in terms of range, in terms of emitted power, in terms of BDS data extraction tasks, etc.) for the purpose of optimizing ATC surveillance by avoiding over-interrogation of the transponders or even blocking thereof. This task may be automatic or manual:

either in relation to the minimums defined by the ICAO;
or in relation to the assumptions made during the installation of this radar. each of the major fruits sources of the radar is characterized 38 by estimating:
  its Mode S identifier,
  its geographical location in relation to the radar,
  its rotation period (if rotary),
  its "All call" interrogation rate,
  the width of its beam (if directional antenna),
  its radiated power, etc.

This approach makes it possible, both in a civil ATC use (where the radars are known theoretically in terms of position, in terms of features and configuration) to check that their settings have not changed (human error during maintenance, etc.), but also in a military ATC use, to ascertain the secondary environment of a radar projected onto an operational theater.

Third Step/Extension to a Plurality of Radars:

This third step is optional, and applies notably in a multi-radar context. In this step, either the response rate of each target is characterized 39, 40 in multi-radar mode, or the surrounding interrogators are located and characterized 34. This third step in fact compiles the results from the three previous steps 35, 36, 37, 38 executed by a plurality of radars, at least two. It is specified here that compilation means recalculation, and this does not correspond only to each radar utilizing the result.

In a context with a single radar (mono radar), the precision of the measurement of the response rate of each target is limited both:
  by the range of the radar, so it covers only part of the space and therefore of targets in flight;
  by the response load generated by all of the targets, specifically in the event of a high instantaneous fruit rate, the decoding performance of a sensor decreases and therefore the latter underestimates the response rate of the targets.

In an application with a plurality of secondary radars (multi radars), the coverage space of the targets and the precision of the measurement are notably improved. In other words, the measurements of the response rate and of the blocking rate per track, and the measurements of the interrogation rate per area and per radar, as well as the location of the other interrogators, are improved.

Specifically, an air traffic control center (civil or military ATC) aims by nature to ensure the tracking of aircraft over very long distances, or even the entire flight, therefore going well beyond the coverage of a single radar.

Moreover, both the power received from the targets and the overlapping configurations of the responses (synchronous and asynchronous) from the targets differ depending on the position of the radars. Thus, taking into account all of the responses (and the "lacks of responses" from targets) through all of the radars makes it possible to improve the response detection rate and thus to better evaluate the real response rate of the targets as their actual blocking rate.

With regard to characterizing the 1090 MHz spectrum, as for the previous step, the multi-radar approach makes it possible to improve both the coverage space and the precision of the measurement of the responses from the targets.

With regard to the location of surrounding interrogators, taking into account a greater coverage, the one constructed from a plurality of radars, allows better detection and characterization of the sensors.

Before describing the steps of the method according to the invention in more detail, a reminder is given of certain information regarding fruits.

Figure 4:
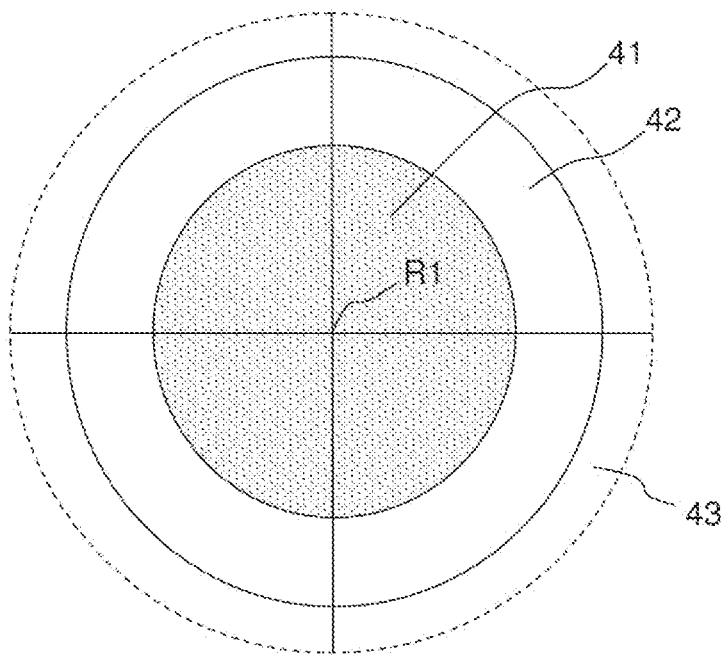
FIG. 4 shows an illustration of the range of a secondary radar.
Figure 5:
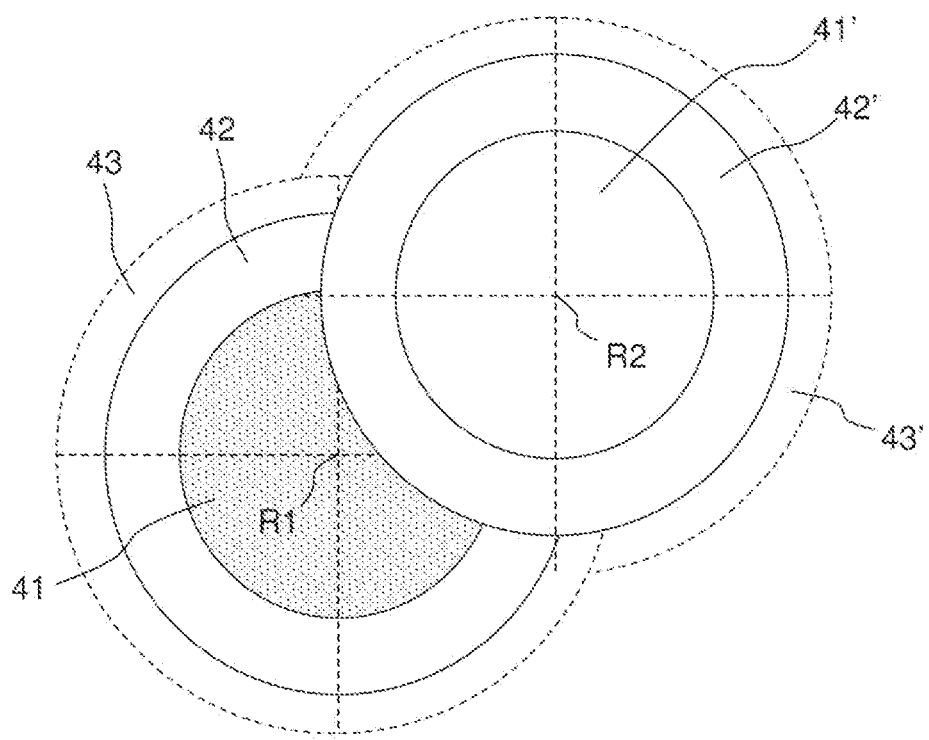
FIG. 5 shows an illustration of the overlap of the ranges of two secondary radars.

The fruits received by a sensor always come from real targets and mainly from those in the radio coverage of the sensor. The invention utilizes the analysis of the fruits to perform the steps described above. FIGS. 4 and 5 characterize these fruits in space.

FIG. 4 illustrates the range of a radar at a given altitude. In order to guarantee surveillance in a given area, a secondary radar (positioned at the point R1) usually has an emission margin in order to guarantee a high probability of detection (greater than 99%) within its area of coverage 41 defined by a first circle centered on R1, so that a target in this area 41, even one equipped with a transponder with low limits of sensitivity at 1030 MHz in accordance with the ICAO standard, is able to correctly interpret the Mode S interrogation. The dialogs of this radar with the targets within its coverage, typically DF4/5/20/21, will be perceived as fruits by another radar having a common coverage portion.

Targets whose transponder is more centered in the sensitivity norm at 1030 MHz, or even at the maximum values of the norm, may then correctly interpret (and therefore respond) over a maximum range greater for transmission than that defined by this first area 41. This results in a second area 42, defined by the first circle and a second circle also centered on R1, where the radar positioned at R1 causes DF11 fruits in the other surrounding radars.

In addition, the radar located at R1 has to detect the synchronous responses at 1090 MHz that it elicited through its interrogations at 1030 MHz. As a result, its reception range at 1090 MHz is in practice greater, through its SUM beam, than its coverage 41, or even than the maximum emission range defined by the second circle 42.

This results in a third area 43 defined by the second circle and a third circle also centered on R1, which is a fruit reception area for the radar, without having associated synchronous plots.

In the remainder of the text, the area 43 will be considered to be the fruit reception limit for the radar. In practice, depending on the features of the antenna patterns, the area for receiving asynchronous responses (fruits) with a good probability of detection by the radar may be of the order of the area 41, or even slightly smaller through its CONT beam.

FIG. 5 illustrates a configuration with two radars. A second radar positioned at a point R2 is located in the environment of the radar located at the point R1, this second radar being at the center of three areas 41', 42', 43' having the same features as the previous areas 41, 42, 43 (this is the same principle, but the values involved are not the same). As shown in FIG. 5, these areas overlap. The radars R1, R2 may be named hereinafter with reference to their positioning point. These radars R1 and R2 are radars each having a different II identifier in order to avoid conflicts at the transponders of the aircraft.

For the remainder of the description, in order to simplify the reasoning, the coverages of each of the 2 radars are considered to be homogeneous in all azimuths. The use of a Mode S coverage map may lead to a reduction in the operational coverage range of a radar in a given sector of its azimuth. The principle of the invention remains the same when it is applied by distinguishing between the sector in question and the other azimuths.

The area of overlap between two radars is divided into different areas depending on the type of dialog that each radar uses with the targets in the areas. The invention advantageously utilizes the types of message exchanged to define these areas in terms of azimuth.

The formats of responses exchanged between a radar and the transponder of an aircraft are known. The type of response depends both:
  on the type of radar;
  on the task assigned thereto in the area of the target with respect to the radar.

Figure 6:
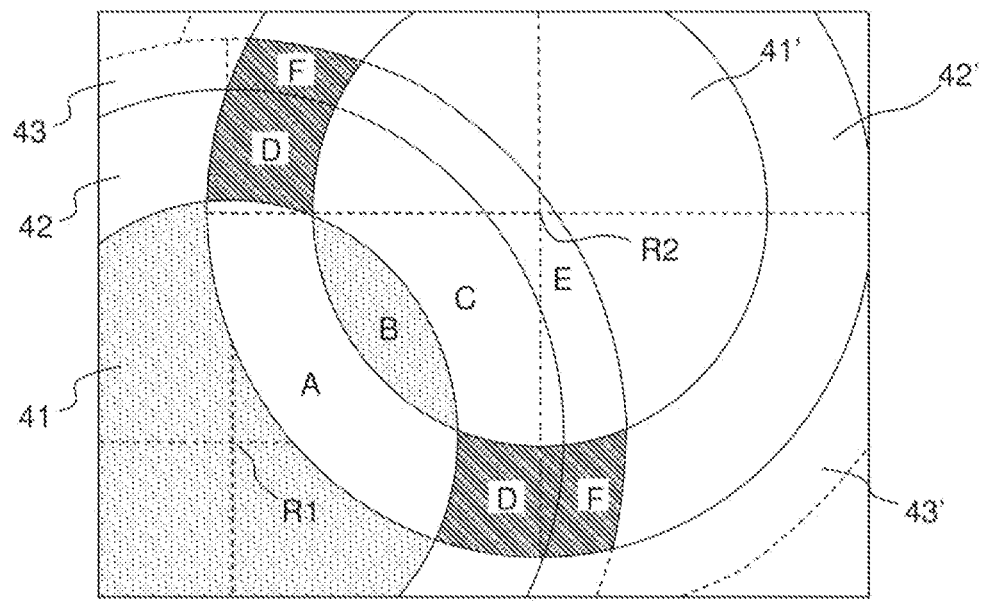
FIG. 6 shows a zoom of the overlap from FIG. 5 with the various areas of overlap.

FIG. 6 shows a zoom on the area of overlap of the emission and detection areas 41, 42, 43, 41', 42', 43' of R1 and R2, defined above.

The table below summarizes, by way of example, in the case of normal operation of a Mode S radar, the respective tasks of R1 and R2 according to whether the target belongs to one of the areas of overlap A, B, C, D, E, F illustrated in FIG. 6.

TABLE 1

| Areas | Radar R1 (I1 1) | Radar R2 (I1 2) | Synchronous response for R1 | Asynchronous response for R1 (fruit) |
|---|---|---|---|---|
| A | Target under Surveillance Locked on I1 | Target outside of Surveillance Not Locked on I12 | DF4, DF5, DF20, DF21 | DF11 |
| B | Target under Surveillance Locked on I1 | Target under Surveillance Locked on I12 | DF4, DF5, DF20, DF21 | DF4, DF5, DF20, DF21 |
| C | Target outside of Surveillance Not Locked on I1 | Target under Surveillance Locked on I12 | DF11 | DF4, DF5, DF20, DF21 |
| D | Target outside of Surveillance Not Locked on I1 | Target outside of Surveillance Not Locked on I12 | DF11 | DF11 |
| E | No synchronous response | Target under Surveillance Locked on I12 | — | DF4, DF5, DF20, DF21 |
| F | No synchronous response | Target outside of Surveillance Not Locked on I12 | — | DF11 |

It will therefore be noted that the radar R1 is able to receive fruits from targets for which it has no associated synchronous plots.

In FIG. 6, a position is adopted in a section at a given altitude. The same approach may be taken considering various altitudes according for example to the vertical section passing through the two radars R1 and R2. In the same way as for a plane at a given altitude, the invention utilizes the exchanged message types to define the areas of overlap in terms of elevation.

Alongside the spatial approach to fruits described above, a temporal approach to fruits may be considered. For this temporal approach, consideration is given to the case of radars with a rotating mechanical antenna, that is to say almost all radars in the world of civil ATC, or even the majority of military surveillance radars by nature of their mission.

The steps of the method according to the invention will now be described in more detail, based on:
the radar architecture relating to the invention (see FIG. 2);
the physical characterization of the fruits as outlined above.

We begin by describing the following sub-steps of the first step: RF detection, association 33 of the fruits with the plots (Mode S and/or ADS-B) and characterization 32 of the fruit sources.

RF detection:
The basic architecture of a Mode S radar makes it possible to receive:
synchronous responses (elicited by the radar) using the selective azimuth patterns SUM and DIFF;
asynchronous responses or fruits (not elicited by the radar) using the four patterns SUM, DIFF, CONT-Front and CONT_Back.

The invention notably utilizes fruits whose format both in terms of RF and in the structure of the response is identical to that of synchronous responses.

To utilize the fruits, firstly the invention adds, to the conventional Mode S radar, a chain for detecting and decoding these asynchronous responses (that a conventional radar usually rejects) by qualifying them with the usual attributes of a response, such as notably:
detection time (precision better than 10 μsec);
azimuth of the antenna;
Mode S address of the emitter transponder;
content of the message;
power of the response according to each antenna pattern.

Depending on the distance from the target to the radar, the fruit may also be detected on a plurality of patterns simultaneously, and in this first step the multiple detections (at the same time) are concatenated to ensure only one single asynchronous response message per fruit.

At this level, the source is not distinguished from the fruit, which is:
either elicited by another sensor (another radar, WAM notably) sharing the same space;
or generated automatically by the target itself (notably TCAS, ADS-B).

As an option to the invention, the operational coverage of the radar (set by the user as less than its guaranteed range) may be extended to its maximum range synchronously (see areas 42 and 42') in order to increase the measurement area of the invention.

The additional synchronous responses thus obtained (with the same operational interrogations of the radar) are processed in the same way as the other synchronous responses from the coverage of the radar in order to create plots that will therefore have the usual attributes of a plot, such as:
time of detection of the plot center;
Mode S address of the emitter transponder,
plot center azimuth;
distance from the plot;
for each response that formed the plot:
detection time (precision better than 10 μsec);
azimuth of the antenna;
success or failure of the interrogation (response received or not);
depointing in the lobe;
content of the message;
power of the response according to each antenna pattern (SUM, DIFF and CONT_Front).

Basically, long ADS-B (DF17) asynchronous responses make it possible to ascertain the position of the target in terms of azimuth and distance (from the Latitude-Longitude-Altitude information in its message) and thus to locate it within the coverage without selective interrogation (primary purpose of this type of squitter for TCAS). The invention utilizes the ADS-B plots in the same way as the Mode S plots of the radar.

Association of the fruits with the plots (Mode S and/or ADS-B):
For each target located in the operational or extended coverage space of the radar:
either by the radar via selective interrogations that generated synchronous responses (DF4/5/11/20/21);
or in ADS-B mode (long DF17 asynchronous response).
the invention associates, with this target, the fruits it generated (based on the unique Mode S address of the transponder as target identifier):
either between two successive synchronous detections in Mode S (close to the turn);
or on a turn basis (for example).

Since the fruit is asynchronous by nature, the position of the target is determined at the time when the fruit is detected, for example by interpolating the position of the target from its trajectory established by the radar in its operational functions (integrated radar and ADS-B) at the time of reception of the fruit.

The fruit is then completely characterized as a synchronous response.

Characterization of the Fruit Source

This characterization may be performed by identity, by the rotation period of the antenna, by location, by the AC interrogation rate, by the lobe of the antenna or else by the radiated power of the fruit source, as will be described below. It is possible to determine all or some of these features. The radar R2 is considered here by way of example as fruit source.

Identification of the Fruit Source

It is sought to obtain a classification of the fruits by radars that caused them (that is to say by radars that emitted the interrogation that caused the response from the transponder of the aircraft). To describe this description, the radar R1 is considered to be contaminated by the radar R2. The approach would be identical with a plurality of surrounding secondary radars.

Given that the responses are of the type:
DF11: basically containing the identifier of the radar in its message (in our example the radar R2);
DF4, DF5, DF20 and DF21: not specifying the intended recipient of the response.

With reference to FIG. 6 and to Table 1, it is therefore necessary to estimate the identifier of the radar for areas B and C.

Figure 7:
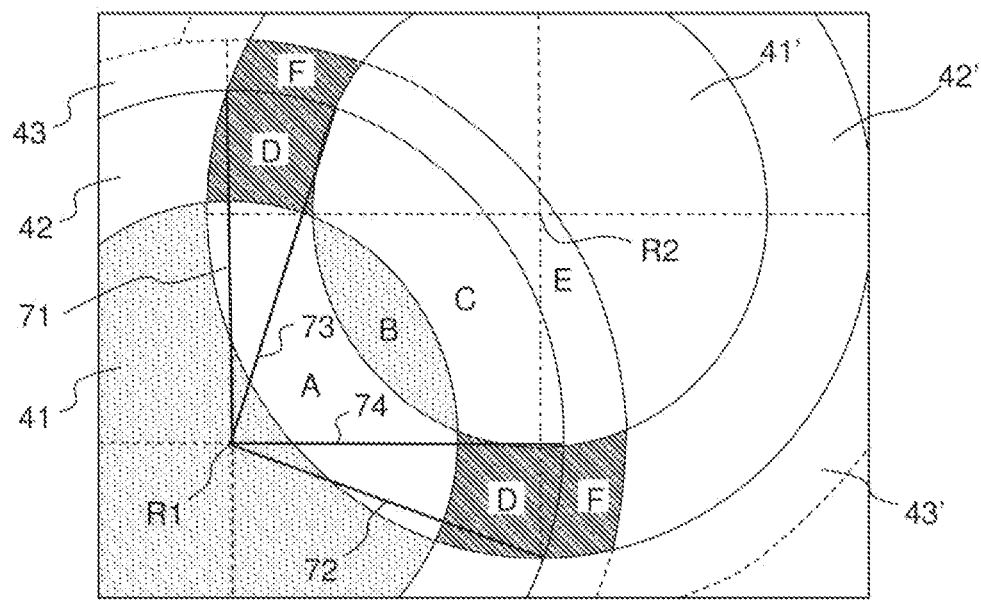
FIG. 7 shows an illustration of the azimuthal area of influence of a radar R2 on a radar R1 with reference to the example of FIGS. 5 and 6.

To this end, consideration is given to both a geographical (spatial) and a temporal approach. The geographical area of influence in terms of azimuth of the radar R2 in the reference frame of the radar R1 is limited, as shown in FIG. 7, which illustrates the azimuth of influence of R2 in the reference frame of R1 (from the zoom in FIG. 6).

The DF11 fruits caused by R2 (denoted DF11_R2) are located on the targets between the "Start max" and "End max" azimuths 71, 72, while the targets causing the DF4, DF5, DF20 and DF21 fruits are necessarily located between the "Start" and "End" azimuths 73, 74.

Figure 8:
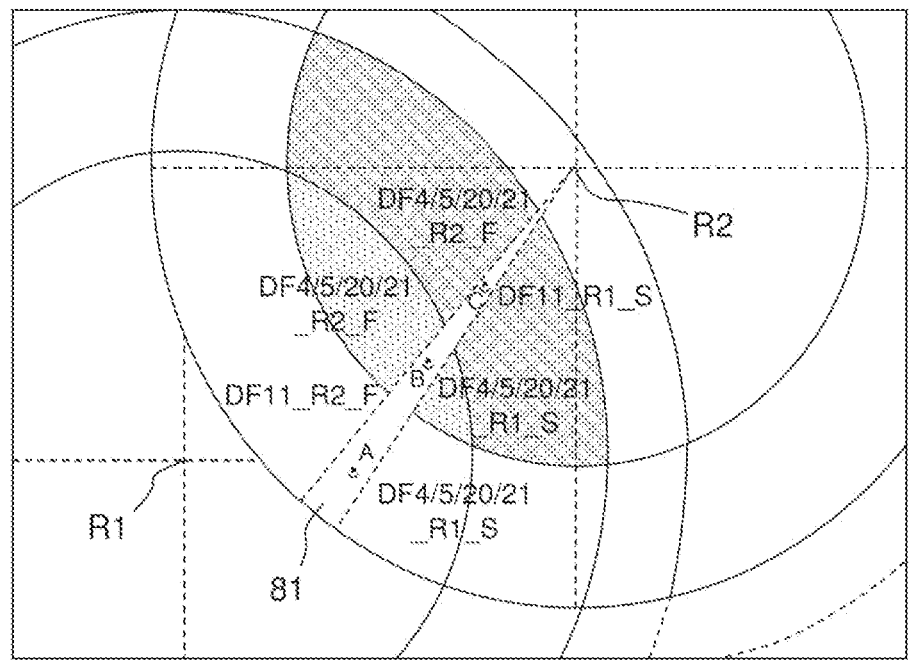
FIG. 8 shows an illustration of the generation of quasi-simultaneous fruits in the beam of said radar R2.

For the temporal approach, consideration is given to the beam 81 of R2 illuminating an area of overlap at a given instant. By way of example, FIG. 8 shows the DF4/5/20/21_R1_S responses corresponding to the DF4, DF5, DF20 and/or DF21 responses due to R1 seen as synchronous by R1, as well as the DF11_R2_F responses corresponding to the DF11 response due to R2 seen as fruit (asynchronous) by R1.

The DF11_R2 fruits of a target in area A are received by R1 almost simultaneously with the DF4, DF5, DF20 and DF21 fruits of the targets present in areas B and C (over the duration of the lobe).

According to the invention, the DF4, DF5, DF20 and DF21 fruits (without information in the response on the radar (II code) that interrogated them) are assigned an estimate of the II code of the interrogator of R2:

if the targets that emitted DF11_R2 are between the azimuths "Azimuth_Start_Max_R2" 71 and "Azimuth_End_Max_R2" 72 (here being the fruits of target A);
if the targets that emitted DF4, DF5, DF20 and DF21 are between the azimuths "Azimuth_Start_R2" 73 and "Azimuth_End_R2" 74 (here being the fruits of targets B and C);
and if the DF4, DF5, DF20 and DF21 fruits are almost simultaneous with the DF11_R2 fruits according to the conventional All Call (AC) and Roll Call (RC) sequencing recommended by Eurocontrol.

This operation is for example repeated each time a DF4, DF5, DF20 and DF21 fruit is associated with a plot of R1 in order additionally to identify its source.

Rotation Period of the Antenna of the Fruit Source

The rotational speed of the antenna of R2 is estimated here. To this end, for each target, an estimate of the rotation period of R2 is calculated upon each turn from the time elapsed between its fruits detected from one turn to another, while taking into account the movement of the target obtained from plots of R1.

Considering that the rotational speed of a radar is conventionally highly stable, all of the estimates of the rotation period of R2 are integrated over a time long enough to ascertain a precise evaluation.

A plurality of integration times are used simultaneously:
very long duration of the order of 1 hour to regularly obtain a precise measurement (civil ATC radar);
long duration of the order of a few minutes to very regularly obtain a correct but less precise measurement (typically for a military ATC radar), which is then tracked over time in order to follow any changes in rotational speed, sequencing in its interrogations or even its location.

Location of the Fruit Source

At least the azimuth of R2 with respect to R1 is estimated here by utilizing the fact that the beam of a secondary radar is fine enough (see FIG. 8) to activate fruits only in a limited area of space. Thus, by utilizing the almost simultaneous fruits of R2, it is possible to establish an estimate of the direction of R2. This is performed as soon as the fruits of R2 are considered to be almost simultaneous.

AC Interrogation Rate of the Fruit Source

The "All Call" (AC) interrogation period of R2 is estimated here.

While the DF4, DF5, DF20 and DF21 fruits are necessary to perform the ELS and EHS functions defined by Eurocontrol, the DF11 fruits are only "residuals" due:
to the Mode S protocol for collecting new aircraft (entering the coverage, at take-off, etc.)
and to the significant tolerances of the transponders of the aircraft and propagation, which lead to a reduction in the locking areas (protocol blocking of the DF11 responses).

The DF11 responses come from the AC interrogation periods to be complied with.

The AC interrogations of R2 cause DF11_R2 fruits in its non-locking area.

Each fruit is:
dated by R1 when it is detected;
positioned at a distance by R1 following its association with a plot of R1.

Next, the various estimates of AC periods are accumulated according to various durations:
either long enough to narrow the location area of R2 with sufficient acuity for a fixed radar (the most common case);
or shorter, in order to manage the case of military ATC radar having non-permanent interrogation management.

A histogram of these AC periods of R2 is then produced. It shows a plurality of correlation peaks depending on the value of the PR (probability of response requested by the radar to the transponder of the aircraft) used by the radar R2:
at the AC period, the peak having a very high value if the PR=0, that is to say a probability of response equal to 1;

at twice the AC period: value peak being very high if the PR=1, that is to say a probability of response of 0.5.

The histogram makes it possible to ascertain both the PRF_AC (UF11 interrogation period in the ACs) and the average PR used by R2 in its area of overlap with R1.

Antenna Lobe of the Fruit Source

The width of the interrogation lobe of the radar R2 is estimated here.

The AC interrogations of R2 cause DF11_R2 fruits from each target, not locked on the II code of R2, present in its beam by eliciting a response rate defined by the PR transmitted in the AC interrogation of R2 (AC_R2).

The PR used by R2 in the area of overlap with R1 is considered to be known, as described above.

Figure 9:
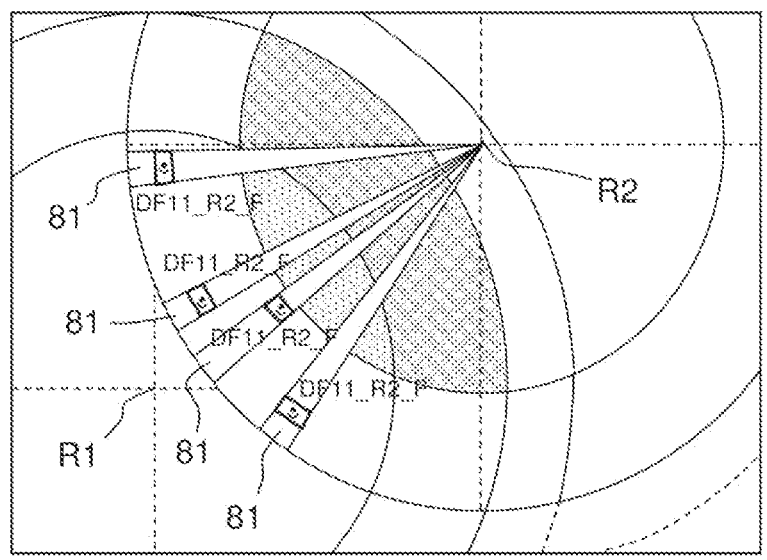
FIG. 9 shows an illustration of the evolution of the beam of said radar R2 during its rotation.

As shown in FIG. 9, when the beam 81 of R2 interrogates a target in area A, this responds to each interrogation AC_R2 according to its PR for the duration of the effective interrogation lobe of R2.

The method according to the invention, on each turn of R2, for each target that has emitted a plurality of DF11_R2 from area A:
  estimates the azimuth in the R1 reference frame of each fruit from:
    the R1 azimuth of the plot at the time of the fruit using the trajectory of the target calculated in operational terms by R1,
    the R1 antenna bearing of the plot at the time of the fruit using the azimuth of the antenna at the time of the fruit;
    the R1 azimuth of the fruit from the difference between its R1 antenna bearing and the bearing of the plot plus the azimuth of the plot;
  calculates the R2 azimuth of each fruit by utilizing the estimated position of R2;
  calculates an estimate of the interrogation lobe of R2 from the maximum R2 azimuth difference between 2 fruits of the same target in one turn of R2.

Next, these various estimates of the interrogation lobe of R2 are for example accumulated over a period long enough to ascertain sufficient acuity for a fixed beam radar (the most common case).

The width of the AC interrogation lobe of R2 is evaluated from:
  the azimuthal width of the main block of occurrences;
  plus the equivalent azimuth of an AC period of R2 multiplied by PR+1.

Radiated Power of the Fruit Source

In this part, the power radiated through the AC interrogations of R2 is approximated.

A description of the sub-steps of the second step will now be given: characterization 35 of the response and blocking rate per target at a radar and characterization of the 1090 MHz spectrum per area at a radar.

Characterization of the Response Rate and of the Blocking Rate Per Target at a Radar It may be noted that, for a given radar, on the basis of its specific features, the following are defined:
  its operational radar coverage (conventional);
  its measurement coverage of the environment (for the purposes of the invention).

It should be noted that, in the example of FIG. 4, the operational coverage is considered to be equal to the measurement coverage of the environment.

To characterize the response rate of a transponder, the radar, for example, for all of the targets within the measurement coverage:
  measures the overall rate of responses from each target received by the radar by counting all of the synchronous and asynchronous responses generated by the target;
  breaks down the overall rate of responses from each target received by the radar:
    by length of generated responses, short or long (according to official specifications);
    by type of responses:
      elicited within coverage;
      elicited outside coverage;
      not elicited.

These operations are for example performed for various time periods.

With regard to the blocking rate of a transponder, this is representative of the congestion of the 1090 MHz spectrum. Specifically, when a transponder receives an interrogation, it is blocked for the other interrogators depending on:
  whether it responds (it cannot then process another interrogation);
  whether it does not respond because:
    it is not the intended recipient;
    it is not within the antenna lobe of the radar;
    the decoded message of the interrogation is erroneous;
    it has reached its maximum number of generated responses.

For a given target, the radar determines whether the transponder is blocked by analyzing the fruits (for example for R2) of this target. One exemplary analysis is given below:
  one of the fruits is received within a time justifying a lack of response from the transponder, the latter therefore being normally occupied;
  if no fruit justifies a synchronous lack of response, the radar R1 then declares blocking of the transponder (in the example of FIGS. 5 to 9).

To decide on the normal occupation of a transponder, the radar R1 calculates for example the position of the respective interrogations of R1 and R2 when they are received at the transponder. The lack of response from the transponder is justified if the interrogation of R1 arrives at the transponder within the time interval located after the interrogation of R2 and before the end of the dead time allocated to the transponder after it has emitted the response to R2.

For all of the targets within the measurement coverage of the environment, the radar may measure the blocking rate of a target tracked by the radar by counting all unjustified lacks of response generated by the target and then dating them for various time periods.

For example, a pre-alert is generated automatically when the blocking rates exceed user-defined thresholds. These thresholds are defined a priori in order to detect a potential fault with the transponder of an aircraft if the response rate of the transponder during the previous time period does not exceed the limits of the ICAO.

Characterization of the 1090 MHz Spectrum Per Area at a Radar

The characterization is highly similar to that described for the characterization of the response and blocking rates.

It focuses on geographical areas instead of focusing on transponders. A description is given below of characterization of the spectrum by area, followed by a description of this characterization of the spectrum by area and by interfering radar.

With the airspace being divided into elementary 3D "Latitude-Longitude-Altitude" cells (for example according to a principle similar to Mode S coverage maps of the operational operation of a Mode S radar), the following is performed per cell:

- counting all of the synchronous and asynchronous responses generated by each target (present in the cell and received by this radar), thereby making it possible to construct a map of the response rate according to the position of the targets in space;
- counting all of the times each target is blocked from the interrogations from this radar, thereby making it possible to construct a map of the blocking rate according to the position of the targets in space.

These operations are for example performed again for various time periods.

It should be noted that ADS-B squitters are taken into account in asynchronous responses since they are emitted by the same transponders, therefore becoming relevant within the limits of the ICAO.

To characterize the 1090 MHz spectrum by area and by interfering radar, it is possible to use the results of the sub-step of characterizing the fruit sources described above, where each other radar notably interfering with the radar R1 (radar R2 in the example under consideration) is first of all characterized, that is to say having a sufficiently large area of overlap with a notable presence of targets both allowing a measurement, but more simply justifying an interest therein.

For each cell, the overall response rate in the cell is broken down:
- by identifying each of the interfering radars in this cell (that generated fruits in this cell);
- by associating therewith the response rate due to each of the radars;
- by specifying the nature and rate of the generated responses for each of the radars.

Features of each interfering radar are also associated with this cell, these features being for example:
- the position of the radar interfering with the radar R1,
- the rotational speed of the antenna;
- the width of the interrogation lobe;
- the "All Call" interrogation rate;
- the radiated power.

Figure 10:
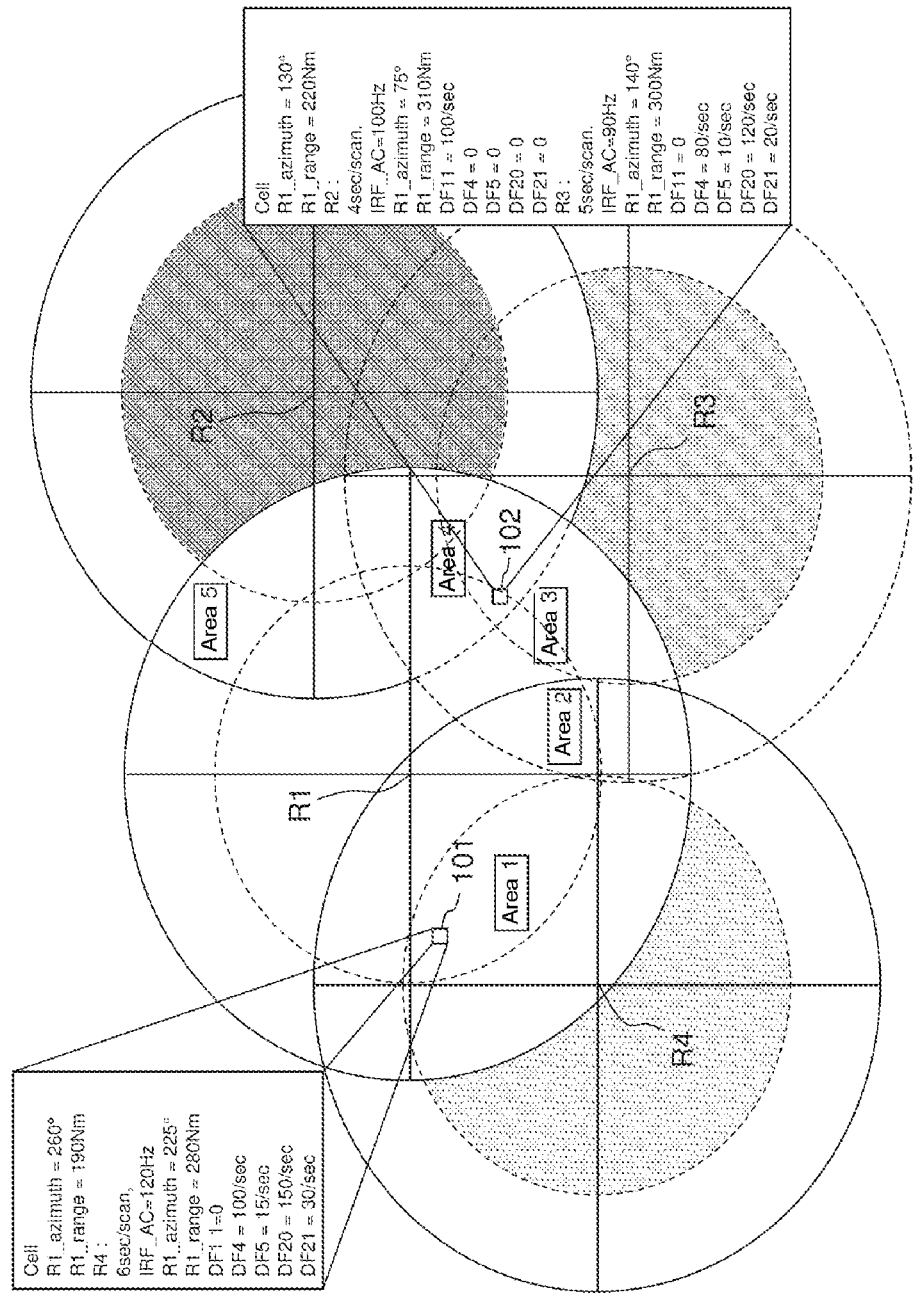
FIG. 10 shows an illustration of the response rates per elementary cell in the areas of coverage of the radars in question.

FIG. 10 illustrates, by way of example, a summary of the response rates per area per radar, in an example with four secondary radars, where three radars, R2, R3 and R4, interfere with the radar R1, two radars R3 and R4 having been added to the radars R1 and R2 in comparison with the previous examples. The radar coverages overlap in several exemplary areas, such as the overlap in the operational coverage of R1.

Area 1; operational coverage of R4 alone;
Area 2; emission range of R4 and R3;
Area 3; emission range of R3 and operational coverage of R2;
Area 4; emission range of R3 and R2;
Area 5; operational coverage of R2 alone;

More specifically, FIG. 10 shows a geographical map of the interrogation rate within the coverage of the radar R1, where two elementary space cells 101, 102 are shown by way of example. The response rate information is also supplemented by information characterizing the sources of asynchronous responses.

The values there are only given as one example of a summary presentation, without any desire to reflect reality (maximum value without an associated measurement time base, etc.).

The first cell 101 is located in a first area of overlap (area of overlap between the coverages of the radar R1 and of the radar R4). In the reference frame of the radar R1, this cell is located at an azimuth of 260° and at a distance of 190 Nm. For this cell, the source that generates the asynchronous responses is the radar R4. The features obtained for this source are:

- its location, at an azimuth of 225° and at a distance of 280 Nm in the reference frame of R1,
- the rotational speed of its antenna, 6 seconds per scan;
- the "All Call" interrogation period, given here by the "All Call" interrogation frequency IRF_AC equal to 120 Hz.

The peak rates of synchronous and asynchronous responses received from targets present in this cell 101 are:
- for DF11 equal to 0;
- for DF4 equal to 100 per second;
- for DF5 equal to 15 per second;
- for DF20 equal to 150 per second;
- for DF21 equal to 30 per second.

The overall response rate in the cell is the sum of all of these rates.

The second cell 102 is located in another area of overlap (area 3 of overlap between the coverages of the radars R1, R2 and R3). In the reference frame of the radar R1, this cell is located at an azimuth of 130° and at a distance of 220 Nm. For this cell, the sources that generate the asynchronous responses are the radar R2 and the radar R3.

The features obtained for the source R2 are:
- its location, at an azimuth of 75° and at a distance of 310 Nm;
- the rotational speed of its antenna, 4 seconds per scan;
- the "All Call" interrogation frequency IRF_AC equal to 100 Hz.

The peak rates of synchronous and asynchronous responses generated by R2 are:
- for DF11 equal to 100 per second;
- for DF4 equal to 0;
- for DF5 equal to 0;
- for DF20 equal to 0;
- for DF21 equal to 0.

The features obtained for the source R3 are:
- its location, at an azimuth of 140° and at a distance of 300 Nm;
- the rotational speed of its antenna, 5 seconds per scan;
- the "All Call" interrogation frequency IRF_AC equal to 90 Hz.

The peak rates of synchronous and asynchronous responses generated by R3 are:
- for DF11 equal to 0;
- for DF4 equal to 80 per second;
- for DF5 equal to 10 per second;
- for DF20 equal to 120 per second;
- for DF21 equal to 20 per second.

The overall rate of synchronous and asynchronous responses coming from targets moving in this cell 102 is the sum of all of these rates.

In a single radar, the invention also proposes to perform the same analyses in order to detect the surrounding radars and to characterize them (without the aim of evaluating the interrogation rate).

A description is now given of the sub-steps of the third step, which is optional. These sub-steps are the characterization of the response rate and the blocking rate of each target in multi-radar mode, the characterization of the 1090 MHz spectrum by area and interfering in multi-radar mode, and the location of the surrounding radars in multi-radar mode.

Characterization of the Response and Blocking Rate of Each Target in Multi-Radar Mode In mono radar mode (example of the radar R1 in the above examples), the precision of the measurement of the response rate of each target is limited both by the range of the radar and by the response load generated by all of the targets.

The aim of this sub-step is therefore to perform the same tasks as the characterization sub-step described above in mono radar mode (fourth one of the sub-steps) by utilizing the information transmitted by each of the radars performing this fourth sub-step. Thus, by utilizing these measurements at a higher level of the ATC system, it is possible to improve the precision of the measurements and to consolidate the identifiers of the interfering radars if they belong to this network of radars performing this fourth sub-step.

The information transmitted is:
the trajectories of the targets managed by each radar (idem for a normal ATC control center);
for each plot:
    the interrogations in its lobe, dated, and the status (failure or success with pointer to the response in this case);
    the synchronous responses, dated and characterized notably by type, power and content;
for each fruit: responses dated and characterized by type, strength, content, etc.

The multi-radar approach therefore makes it possible to construct, for each target within the multi-radar area of coverage, its response and blocking rate in a more precise and reliable manner, notably:
by counting the interrogation rate of each radar on this target and by therefore eliminating, from the statistics, the fruits declared by another radar in the network that are dated synchronously with the reception at the transponder, thus:
    the responses not detected as fruit because of range or overlap of responses are this time taken into account
    the assumed blockages are confirmed or not confirmed if interrogation of another radar is dated synchronously with interrogation of the radar that declared the blockage;
by removing duplicate fruit detected simultaneously by a plurality of radars in the network;
by replacing the estimates of the features of the radars in the network with the values known by the installers of these radars in civil ATC.

Managing these data per target may make it possible to generate a pre-alert when the response or blocking rates exceed user-defined thresholds pointing to transponder failures that need to be repaired (below the minimums defined by the ICAO).

Characterization of the 1090 MHz Spectrum by Area and by Interfering in Multi-Radar Mode.

Like the above sub-step, the multi-radar approach makes it possible both to improve the coverage space and the measurement precision of the responses from the targets.

The multi-radar approach therefore makes it possible to construct, within the multi-radar coverage area, more precisely and more reliably:
a map of the response rate;
for each contributing element (radar in the network, ADS-B or the like), the nature of the response and its rate;
a map of the blocking rate;
for various time periods.

Managing these data by area may make it possible to generate a pre-alert when the response or blocking rates of certain cells exceed user-defined thresholds.

In addition, cross-correlating this information allows the operator to identify the source of blockage of a transponder, and therefore allows him:
either to construct a different settings policy for certain radars in the network (reduce the power, the range, the interrogation rate, etc.) in order to locally reduce the response rate,
or to look for an external source of contamination not referenced in the radar network.

Typically in a configuration of military radars projected onto an operational theater, the multi-radar detection and location approach according to the same principles as those cited above makes it possible to increase both the coverage of the analyzed space and the detection/location rate of other radars.

This listing of claims replaces all prior versions, and listings of claims in the application:

1. A method for characterizing the density of Mode S interrogations and responses in the environment of at least one operational secondary radar (R1), said environment being defined by the airspace domain covered by said radar (R1), said environment being passed through by Mode S targets, a Mode S target being a target emitting a response to the Mode S interrogations emitted by a secondary radar, comprising:
   a first step wherein said radar (R1):
      detects and locates Mode S targets by way of their synchronous responses to the interrogations emitted by said radar (R1) or their positions transmitted in long ADS-B squitters;
      detects (32) asynchronous responses emitted by the same Mode S targets, and therefore not elicited by said radar (R1);
      for each located target, associates (33) its asynchronous responses with the synchronous responses to said radar (R1) or the positions given by said ADS-B squitters;
   a second step wherein said radar (R1):
      based on said association, determines the response rate of each target by counting the number of synchronous and asynchronous responses received from said target for various given time periods;
      with said environment being divided into elementary space cells, determines the response rate per cell by counting the number of synchronous and asynchronous responses received by each target located in each cell, said rate characterizing the density of Mode S interrogations and responses per cell or per group of cells.

2. The method as claimed in claim 1, wherein the asynchronous responses are detected by said radar (R1) through continuous processing involving detecting and decoding the asynchronous responses received on each antenna pattern, said processing separately utilizing each of said patterns.

3. The method as claimed in claim 2, wherein said patterns are the sum pattern, the difference pattern, the front control pattern and the back control pattern.

4. The method as claimed in claim 1, wherein said asynchronous responses not elicited by said radar (R1) are:
   responses elicited by another secondary radar (R2, R3, R4), which may be any type of interrogator;
   and/or responses generated automatically by said targets, comprising ADS-B or TCAS squitter responses.

5. The method as claimed in claim 1, wherein in said second step, said radar (R1) characterizes the sources (R2, R3, R4) of asynchronous responses, said sources being secondary radars, which may be any type of interrogator, a source being characterized by at least one feature from among the following features:

the identity of said source;
the rotation period of the antenna of said source;
the location of said source;
the "All Call" interrogation rate of said source;
the width of the interrogation lobe of said source;
the power radiated by said source.

6. The method as claimed in claim 1, wherein an alert signal is generated when the rate of responses received from a target exceeds a given threshold.

7. The method as claimed in claim 1, wherein an alert signal is generated when the response rate of at least one cell exceeds a given threshold.

8. The method as claimed in claim 1, wherein with the blocking of a target being the inability of said target to emit a response to a Mode S interrogation, in said second step, said radar (R1) characterizes the blocking rate of a target by analyzing the asynchronous responses from said target:

either by characterizing the lack of response from the transponder of this target:
by its occupation to generate a response using a synchronous fruit of the interrogation that has not received a response at the transponder;
or by a response rate beyond the ICAO limits within the period prior to the lack of response to an interrogation;

or by assuming another scenario corresponding to:
an overlap of interrogations emitted by a plurality of sensors and not interpreted by the transponder of this target;
a transponder of this target having reached its maximum response rate, even though this is below the ICAO minimum.

9. The method as claimed in claim 1, wherein with said first step and said second step being executed in a multi-radar context, that is to say by at least two secondary radars, said response rates obtained by each of said at least two radars are calculated considering all of the synchronous and asynchronous responses from the two radars in order to obtain more precise overall response rates, the interrogation density being characterized by way of these overall rates.

10. The method as claimed in claim 8, wherein said blocking rates obtained by each of said at least two radars are calculated considering all of the synchronous and asynchronous responses from the two radars in order to obtain a more precise overall blocking rate.

11. The method as claimed in claim 9, wherein the information obtained from each of said at least two radars is transmitted to an air traffic control center and utilized by said center.

12. The method as claimed in claim 11, wherein said information is utilized to allow all of the secondary radars to be adjusted in order to eliminate areas of over-interrogation, of blocking of the transponders as well as faulty transponders in order to increase ATC surveillance safety.

13. Secondary radar, wherein it is able to implement the method as claimed in claim 1.

* * * * *

UNITED STATES PATENT AND TRADEMARK OFFICE
CERTIFICATE OF CORRECTION

| | |
|---|---|
| PATENT NO. | : 11,635,508 B2 |
| APPLICATION NO. | : 17/259510 |
| DATED | : April 25, 2023 |
| INVENTOR(S) | : Philippe Billaud |

It is certified that error appears in the above-identified patent and that said Letters Patent is hereby corrected as shown below:

In the Claims

In Claim 1, Column 24, Line 35, "detects (32) asynchronous responses" should be -- detects asynchronous responses --.

In Claim 1, Column 24, Line 38, "for each located target, associates (33) its asynchronous" should be -- for each located target, associates its asynchronous --.

Signed and Sealed this
Thirteenth Day of June, 2023

Katherine Kelly Vidal
*Director of the United States Patent and Trademark Office*